(12) United States Patent
Redmond

(10) Patent No.: US 6,540,629 B2
(45) Date of Patent: Apr. 1, 2003

(54) FLEXIBLE IDLER

(75) Inventor: John D. Redmond, Littleton, CO (US)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 09/821,419

(22) Filed: Mar. 28, 2001

(65) Prior Publication Data

US 2001/0034281 A1 Oct. 25, 2001

Related U.S. Application Data

(60) Provisional application No. 60/193,009, filed on Mar. 29, 2000.

(51) Int. Cl.⁷ ................................................ F16H 7/12
(52) U.S. Cl. ........................ 474/135; 474/197; 474/191; 474/190
(58) Field of Search ............................... 474/135, 112, 474/125, 110, 109, 136, 197, 191, 192, 161, 190

(56) References Cited

U.S. PATENT DOCUMENTS

| | | | |
|---|---|---|---|
| 2,590,182 A | 3/1952 | Kessler et al. | 74/221 |
| 3,216,267 A | 11/1965 | Dolza | 74/219 |
| 4,011,938 A | 3/1977 | Kain | 198/824 |
| 4,589,861 A | 5/1986 | Dodge | 474/178 |
| 4,621,728 A | 11/1986 | Kain | 198/827 |
| 4,821,871 A | 4/1989 | Herren | 198/843 |
| 5,271,742 A | 12/1993 | Mitcham | 474/112 |
| 5,388,656 A | 2/1995 | Lagasse | 180/9.21 |
| 5,413,536 A | 5/1995 | Wong et al. | 474/101 |
| 5,538,484 A | 7/1996 | Bell | 476/40 |
| 6,162,141 A | 12/2000 | Rointru et al. | 474/109 |

Primary Examiner—Christopher P. Schwartz
Assistant Examiner—Devon Kramer
(74) Attorney, Agent, or Firm—J. A. Thurnau, Esq.; C. H. Castleman, Esq.; S. G. Austin, Esq.

(57) ABSTRACT

An idler having a flexible member. The flexible member comprises a rubber or elastomeric material. The flexible member also defines a gas chamber. The spring rate of the flexible member is a function of the flexible material and the size of and pressure in the gas chamber. A belt or chain bearing surface of the flexible member bears upon a belt or chain trained between two pulleys. The flexible member is compressible in response to a preload caused as the idler is pressed against the chain or belt. The flexible member damps vibrations in the belt or chain during operation. This results in quieter operation of the idler/pulley system as well as increases the operating life of the belt.

17 Claims, 5 Drawing Sheets

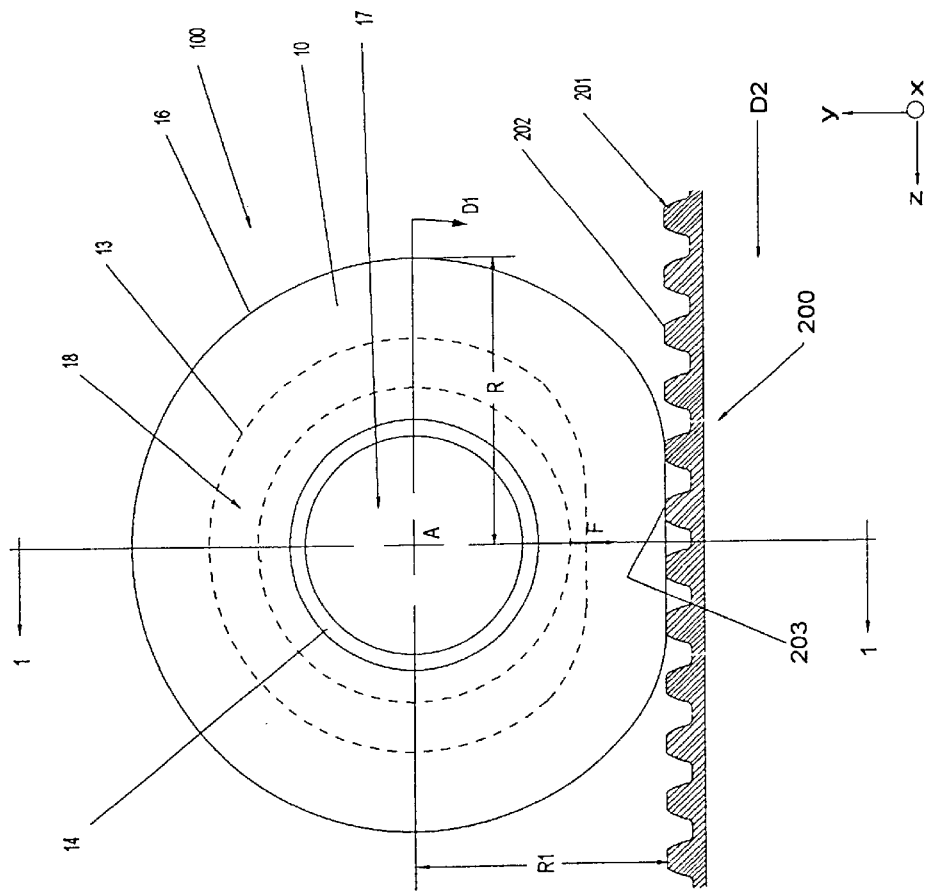
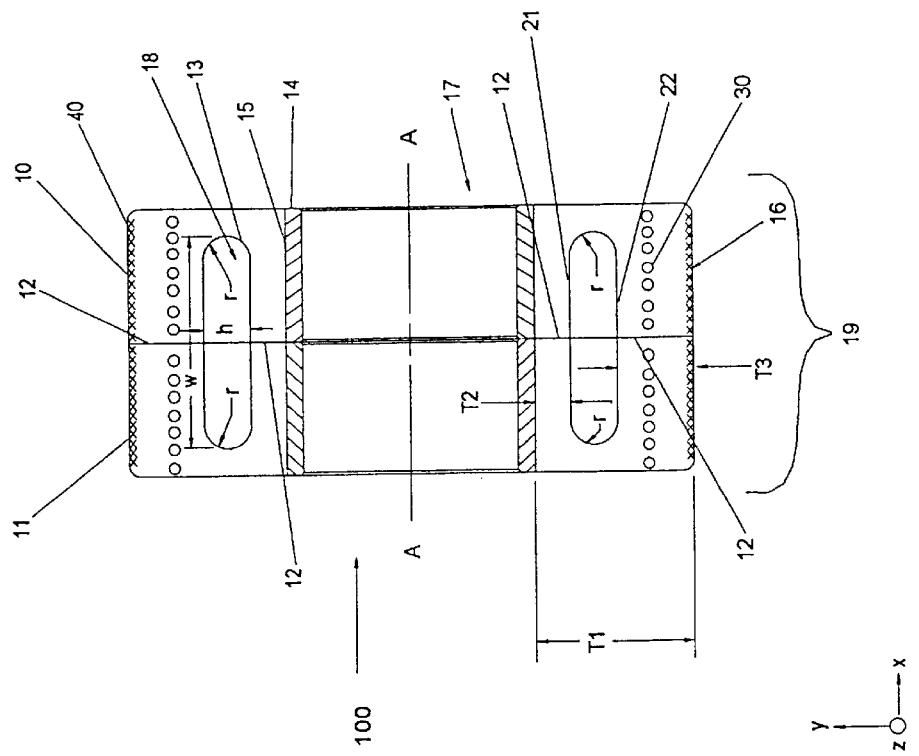
Fig. 2
Fig. 1

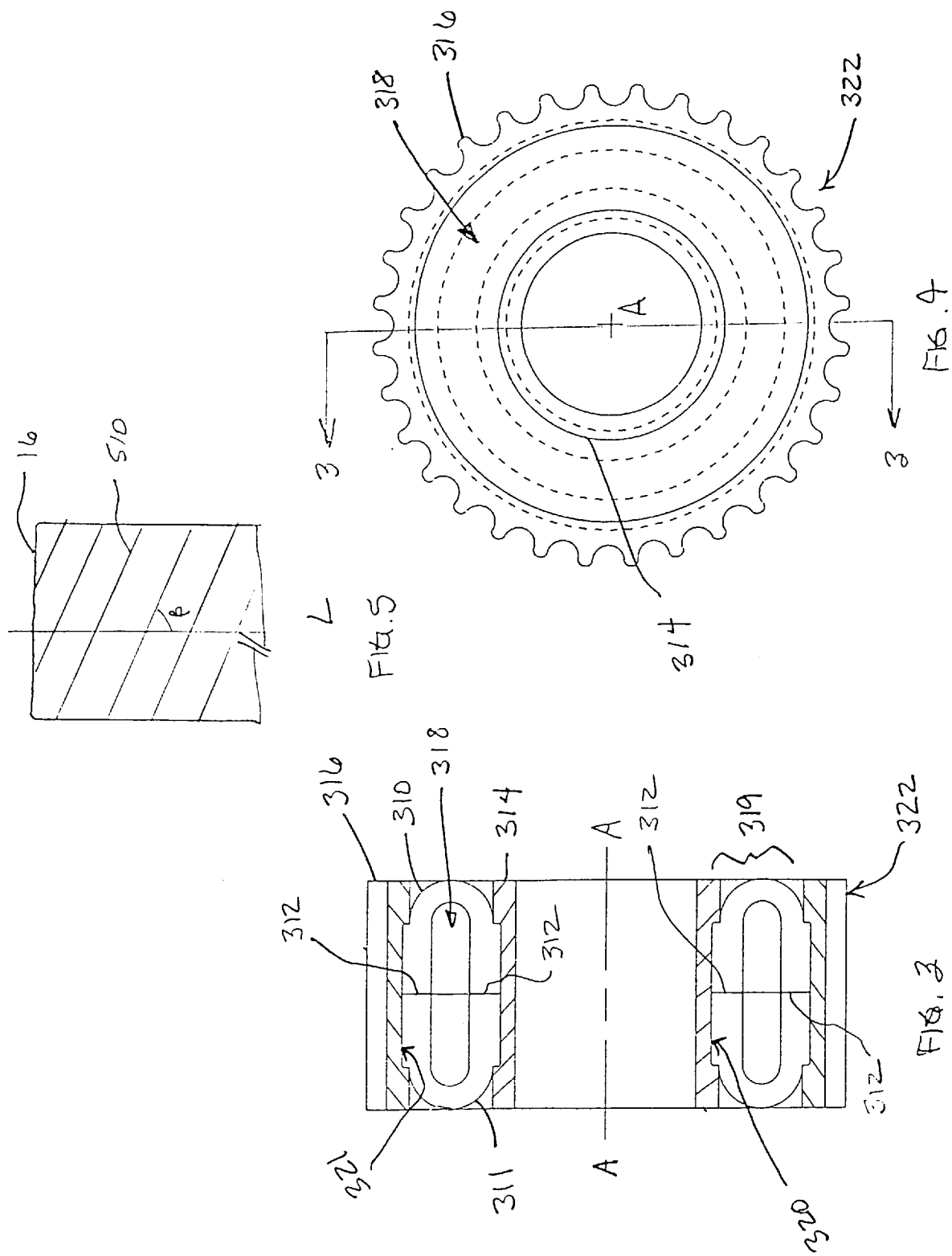

FLEXIBLE IDLER

REFERENCE TO RELATED APPLICATIONS

This application claims priority from provisional application No. 60/193,009 filed Mar. 29, 2000.

FIELD OF THE INVENTION

The invention relates idlers, and more particularly, to flexible pneumatic idlers.

BACKGROUND OF THE INVENTION

Transmission of power by belt can be accomplished by a driver pulley and a single or series of driven pulleys about which a belt is trained. For proper operation, it is necessary for the belt to maintain a certain preload as it operates between the driver and the driven. In such a case, the belt can be trained over an idler which allows the belt preload to be maintained with minimal loss of efficiency.

Idlers generally comprise a base or axle that is mounted on a non-rotating surface. The belt bearing surface or pulley is then rotatably connected to the axle by means of a bearing. The bearing may be a ball bearing type having an inner and outer race. In most arrangements, the inner race of the ball bearing is attached to the idler base or to the non-rotating mounting surface directly. The idler pulley is then attached to the outer race of the ball bearing. The outer race and the pulley rotate together. Other bearing types may comprise sleeve bearings or needle bearings.

Idlers may comprise a toothed belt surface or smooth belt surface. Generally idlers comprise a non-flexible material such as plastic or phenolic.

Toothed belt drives are also known for motorcycle motors. A belt is routed between the crankshaft and the transmission shaft. The belts are installed with a certain preload in order to avoid skipping. It is necessary to use a tensioner bearing on the belt in order to maintain the proper preload because the crankshaft and the transmission shaft are on fixed centers. Prior art idlers comprise a non-compressible material mounted on a bracket or mounting surface. The idler runs on the belt and the spring provides the necessary preload.

Representative of the art is U.S. Pat. No. 5,413,536 to Wong et al. (1995) that discloses a pulley idler that is an integral member and has two cylindrical end portions with a flexible middle portion between them.

Also representative of the art is U.S. Pat. No. 5,388,656 to Lagasse (1995) that discloses a traction unit for the road wheel of a farm tractor comprising, in part, idlers that each comprise a pneumatic tire located in the same plane as the vehicle tire.

The prior art idlers do not provide a flexible member having a gas chamber at an ambient pressure. Nor does the prior art teach an idler that operates in a deformed compressed state. Nor does the prior art teach an idler that dampens vibrations of a belt.

What is needed is a flexible idler having a gas chamber at an ambient pressure. What is needed is a flexible idler that operates in a deformed compressed state. What is needed is a flexible idler that damps vibrations of a belt. The present invention meets these needs.

SUMMARY OF THE INVENTION

The primary aspect of the invention is to provide a flexible idler having a gas chamber having an ambient pressure.

Another aspect of the invention is to provide a flexible idler that operates in a deformed compressed state.

Another aspect of the invention is to provide a flexible idler that damps vibrations of a belt.

Another aspect of the invention is to provide a flexible idler that is highly compressible.

Other aspects of the invention will be pointed out or made obvious by the following description of the invention and the accompanying drawings.

The invention comprises an idler having a flexible member. The flexible member comprises a rubber or elastomeric material. The flexible member also defines a gas chamber. The spring rate of the flexible member is a function of the flexible material and the size of and pressure in the chamber. A belt bearing surface of the flexible member bears upon a belt trained between two pulleys. The flexible member is highly compressible in response to a preload force created as the pulley presses against the belt. The flexible member damps vibrations in the belt during operation. This results in quieter operation of the idler/pulley system. The inventive idler is particularly well adapted to operating in small confined areas with belts under high loads and speeds.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 1 is a cross-sectional view of the preferred embodiment along line 1—1 in FIG. 2.

FIG. 2 is a side cross-sectional view of the preferred embodiment.

FIG. 3 is a cross-sectional view of an alternate embodiment along line 3—3 in FIG. 4.

FIG. 4 is a side cross-sectional view of an alternate embodiment.

FIG. 5 is a partial front view of the bearing surface.

DETAILED DESCRIPTION OF THE PREFERRED EMBODIMENT

Figure 6:
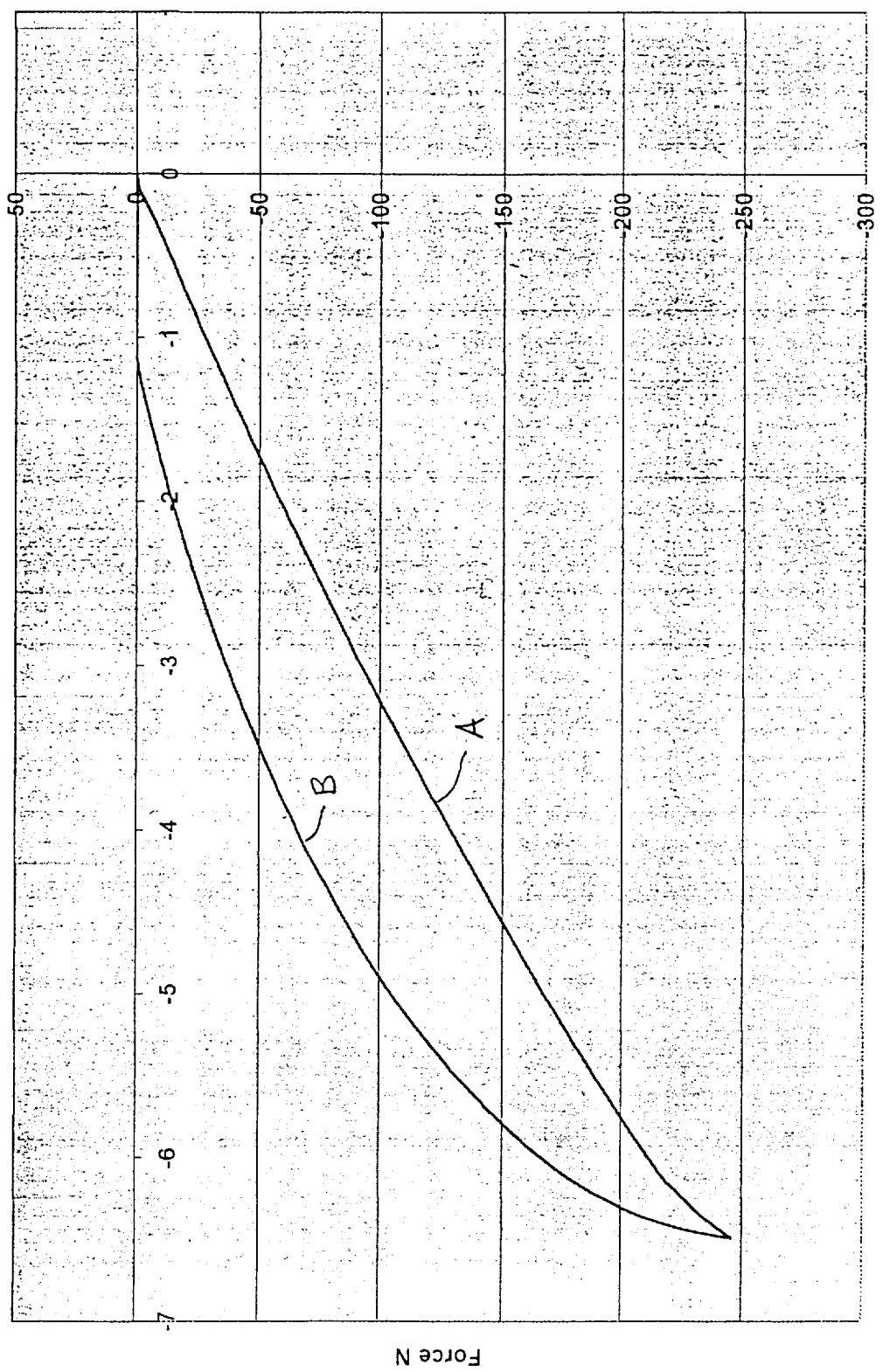
FIG. 6 is a graph depicting a force/distance curve of the invention.

FIG. 1 is a cross-sectional view of the preferred embodiment along line 1—1 in FIG. 2. Idler 100 rotates about rotational axis A and comprises flexible rings 10, 11 attached or bonded to hub 14 at surface 15. Hub 14 may be mounted on a shaft (not shown) through bore 17.

Flexible rings 10, 11 are bonded together at mating surfaces on part line 12. Flexible rings 10, 11 when bonded together at each respective mating surface comprise flexible member 19. Flexible member 19 may comprise rubber or any other elastomeric material known in the art. In an alternate embodiment, tensile cords 30 run within flexible member 19 parallel to a longitudinal axis of the flexible member 19. The tensile members prevent the belt bearing surface of the flexible member from deforming in response to the centrifugal force caused by rotation of the pulley.

Tensile cords 30 may comprise twisted or braided cords of organic fibers such as polyaramids, polyesters, polyamide, or PBO, or inorganic fibers such as steel, glass, or carbon. Preferably, a high strength, high modulus cord material such as polyaramid, PBO, carbon or glass is used.

Flexible member 19 describes an enclosed volume or gas chamber 18. Gas chamber 18 has a width w and a height h. Chamber 18 generally describes an oblong shape where (w>h). Each end of chamber 18 describes a radius r, where r=(½)h. Chamber 18 also comprises inner surface 21 and outer surface 22. One skilled in the art can appreciate that the ends of the chamber may also describe flat sides or have rounded corners.

Gas chamber 18 contains a gas pressure. The gas may be atmospheric air or any one of a number of commercially available gases, such as nitrogen or helium. Chamber 18 may contain a pressure equal to the ambient atmospheric pressure at the time of assembly. The pressure in chamber 18 may also be increased to any required level in excess of ambient to compensate for an increased belt force F. In the pressure tight embodiment, as the operating temperature of the idler increases, so too will the pressure in the chamber increase according to known thermodynamic principles. As the pressure increases, so does the spring rate as described herein.

In a vented chamber embodiment, a pressure path such as a hole through either ring 10, 11 is provided from the chamber 18 to allow the chamber to communicate with the outside atmosphere. The pressure in the chamber 18 will then be equal to the ambient atmospheric pressure regardless of the operating temperature of the idler.

A belt or chain runs on bearing surface 16. Bearing surface 16 in the preferred embodiment has a flat profile as shown in FIG. 2. Surface 16 may also have a toothed profile, a v-groove profile or a multi-ribbed profile, each form known in the art. The toothed profile embodiment is arranged as shown in FIG. 4. The v-groove profile and multi-ribbed profile each have the respective groove or ribs running about the outer circumference of the flexible member 19, parallel to the longitudinal axis L, see FIG. 5.

Bearing surface may also have helical grooves 510 running at angle β to the longitudinal axis L of the pulley as shown in FIG. 5, a partial front view of the bearing surface. Angle β is in the range of 0+° to 90°. Helical grooves reduce the magnitude and direction of an impact vector between the belt 200 and the bearing surface 16, thereby reducing the noise at the belt/pulley interface.

In an alternate embodiment, a fabric jacket 40 may be vulcanized to belt bearing surface 16. The fabric jacket may comprise woven, non-woven or knit fabrics of polyester, polyamide, polyaramid, cotton, softwoods, hardwoods, or acrylic fibers or blends thereof. Adhesive treatments appropriate for bonding the fabric jacket to the belt bearing surface may also be used. Fabric jacket 40 is not used in the preferred embodiment.

In operation, idler 100 is mounted on a surface so it is held in pressing engagement against belt 200 with force F in order to properly preload the belt. Application of force F to the belt causes flexible member 19 to be compressed, see FIG. 2.

Compressibility of flexible member 19 is a function of the spring rate k. Spring rate k is determined by the characteristics of the material of which flexible member 19 is constructed; the amount and thickness of material of which flexible member is constructed; and the size and shape of chamber 18. Thickness' T1, T2, and T3 may be individually modified in order to increase or decrease the spring rate of the flexible member and, thereby, of the idler. In the preferred embodiment, T3 is greater than T2. In conjunction with this, the size of chamber 18 may be increased or decreased correspondingly by changing the height h, or width w, or both.

Generally, for a given idler radius R, an increase in the size of the chamber will result in a decrease in the spring rate. Of course, pressurization of the chamber 18 will result in a commensurate increase in spring rate k. Spring rate k is preferably in the range of 0+N/mm to 50N/mm.

During operation, a belt running between pulleys over the idler will be subjected to various force inputs, usually by the driver pulley. The forces will tend to make the belt vibrate in various modes and axis between the pulleys. As an example and not as a limitation, the inventive idler may operate on a belt operating at a linear speed of up to 20 m/s. Vibrations in the X, Y and/or Z directions will adversely affect the life of the belt. The idler serves to dampen these vibrations by absorbing a portion or all of the vibrational energy in the body of the flexible member 19.

Damping by the idler 100 is affected by the spring rate k of the flexible member. The damping effect of the system being a function of the flexible member spring rate k, as well as the preload force, F. A damping factor ζ, is a function of the natural frequency of the system, $\omega_n$ and the frequency of the disturbing force, $\omega_d$, given as $\zeta = \sqrt{(1-(\omega_d/\omega_n)^2)}$. A natural frequency, $\omega_n$, of the system may be characterized as: $\omega_n = \sqrt{(kg/F)}$, where g=9.806 m/s². The frequency of the disturbing force, $\omega_d$, may be a function of the rotational speed of a driven pulley as driven by an internal combustion engine as each cylinder fires. The desired damping of the system is determined by adjusting the spring rate k of the flexible member and the amount of preload force F. The greatest damping occurs in the Y-axis, which is normal to the idler pulley axis A.

Also during operation, a prior art hard surface idler will cause gear mesh and other running noise caused by the belt contacting the belt bearing surface 16. Such running noise is objectionable. Running noise is significantly reduced in the inventive idler due to the vibration damping characteristics of the flexible member 19. Further, the inventive idler allows use of a flat belt bearing surface without the attendant problem of mesh noise that would otherwise be caused by contact of the to tooth tips 202 with the flexible bearing surface 16. This represents a significant decrease in cost over the prior art idlers since it is not necessary to provide a cooperating tooth profile in the idler.

As one skilled in the art can appreciate, the spring rate and hence, damping characteristics of the flexible idler can be readily maximized by adjusting the foregoing according to a particular system's needs.

FIG. 2 is a side cross-sectional view of the preferred embodiment. A section of toothed belt 200 having a plurality of teeth 201 is shown trained between two pulleys (not shown). Idler 100 rotates in direction $D_1$ about axis A as the belt runs between the pulleys in direction $D_2$. Idler 100 presses against belt 200 with force F. This causes a deflection of the belt 200 and a reduction in uncompressed radius R to compressed radius $R_1$. $R_1$ may be in the range of (1.00)R to (0.50)R. The idler is more compressible under load than prior art idlers. The idler may exhibit two spring rates based on two modes. The first mode spring rate is a function of compression of the chamber 18 as shown in FIG. 2. The second mode occurs when chamber 18 is fully compressed so that surface 21 is in contact with surface 22.

The second mode causes the spring rate to be increased as a function of the compressibility of the idler material exclusive of the contribution from chamber 18. Also, as shown in FIG. 2, bearing surface 16 is flat across the width of the idler. Therefore, the only the tips 202 of teeth 201 contact belt bearing surface 203 during operation.

FIG. 3 is a cross-sectional view of an alternate embodiment along line 3—3 in FIG. 4. Flexible ring 310, 311 are bonded together at the mating surface part line 312 of each to form flexible member 319. The mating surfaces extend normal to the bearing surface 16. Gas chamber 318 is formed by flexible rings 310, 311. Flexible member 319 is mechanically connected to hub 314 by groove 320.

Toothed ring 322 further comprises bearing surface 316. Toothed ring 322 is mechanically connected to flexible member 319 by groove 321 in a manner similar to that of groove 320 to hub 314. Toothed ring 322 may comprise a plastic, phenolic or metallic material. Bearing surface 316 describes a shape that cooperates with a toothed belt profile. Adhesives may be used to further bond flexible member 391 to hub 314 and to toothed ring 322.

FIG. 4 is a side cross-sectional view of an alternate embodiment. The toothed profile of bearing surface 316 is shown. Operation of the alternate embodiment flexible member is as described above in FIGS. 1 and 2. In addition, due to the flexible nature of flexible member 319, the inventive idler can tolerate a misalignment between a rotational axis A and a belt path. Therefore, maintenance requirements are reduced as compared to prior art idlers requiring occasional re-alignment.

FIG. 6 is a graph depicting a force/distance curve of the invention. The values in the graph are positive, although the curves are drawn in the third quadrant which is why the entries on the graph are depicted as negative. The y-axis depicts force in Newtons and the x-axis depicts compression in mm's. The graph shows a spring rate of 25N/mm. Curve A shows the idler under the compression stroke and curve B shows the idler under the return or rebound stroke as it is unloaded. The height (T1-T2-T3, see FIG. 1) of the chamber 18 used in the graph was 6.5 mm. This is why the spring rate increases non-linearly as the compression distance approaches 6.5 mm. Once the chamber 18 is fully compressed the spring rate may exceed 100 N/mm. The elastomeric material was rubber having a durometer in the 50–80 range.

Figures 7, 8:
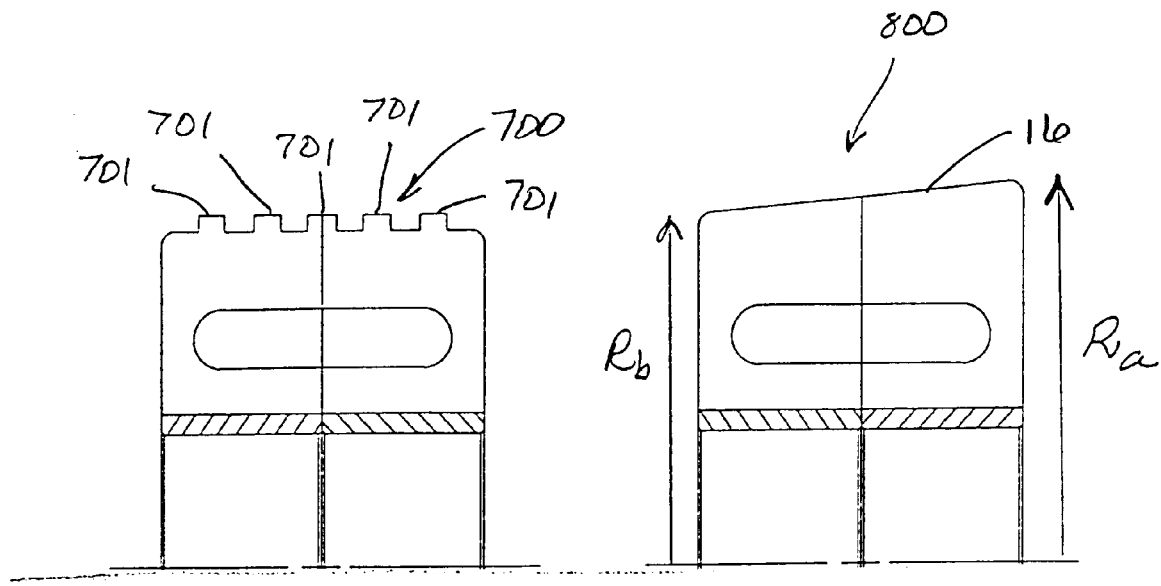
FIG. 7 is an elevation view of an alternate idler profile.
FIG. 8 is an elevation view of an alternate idler profile.

FIG. 7 is an elevation view of an alternate idler profile. The multi-ribbed profile 700 is shown. Ribs 701 each bear on a belt (not shown). This profile further reduces the amount of contact surface area between the belt and the bearing surface.

FIG. 8 is an elevation view of an alternate idler profile. The tapered profile 800 is shown. The radius of the belt bearing surface 16 decreases from Ra to Rb causing the idler to have a conical cross-section, or taper, across the width of the idler.

Figures 9, 10:
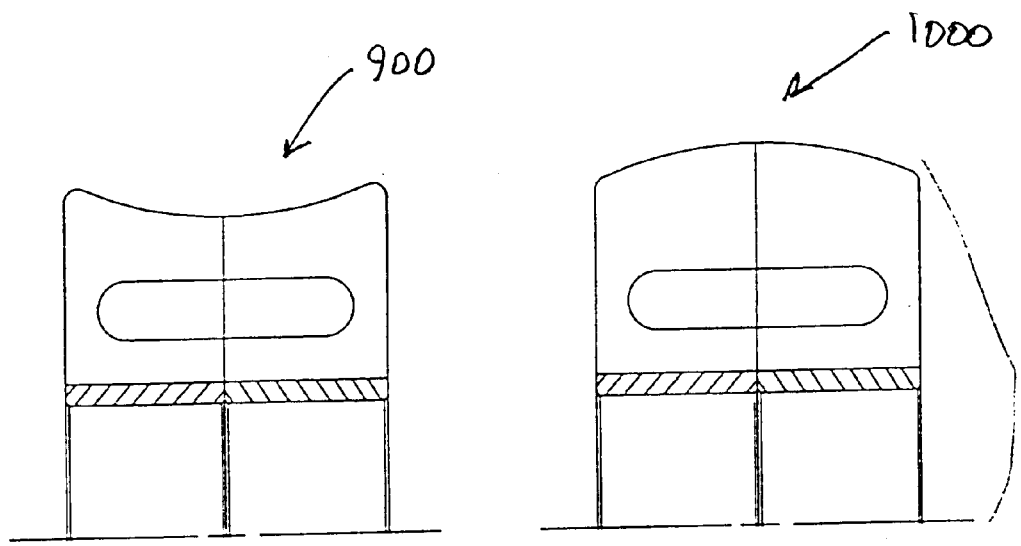
FIG. 9 is an elevation view of an alternate idler profile.
FIG. 10 is an elevation view of an alternate idler profile.

FIG. 9 is an elevation view of an alternate idler profile. A concave profile 900 is shown.

FIG. 10 is an elevation view of an alternate idler profile. A crowned or convex profile 1000 is shown.

Figure 11:
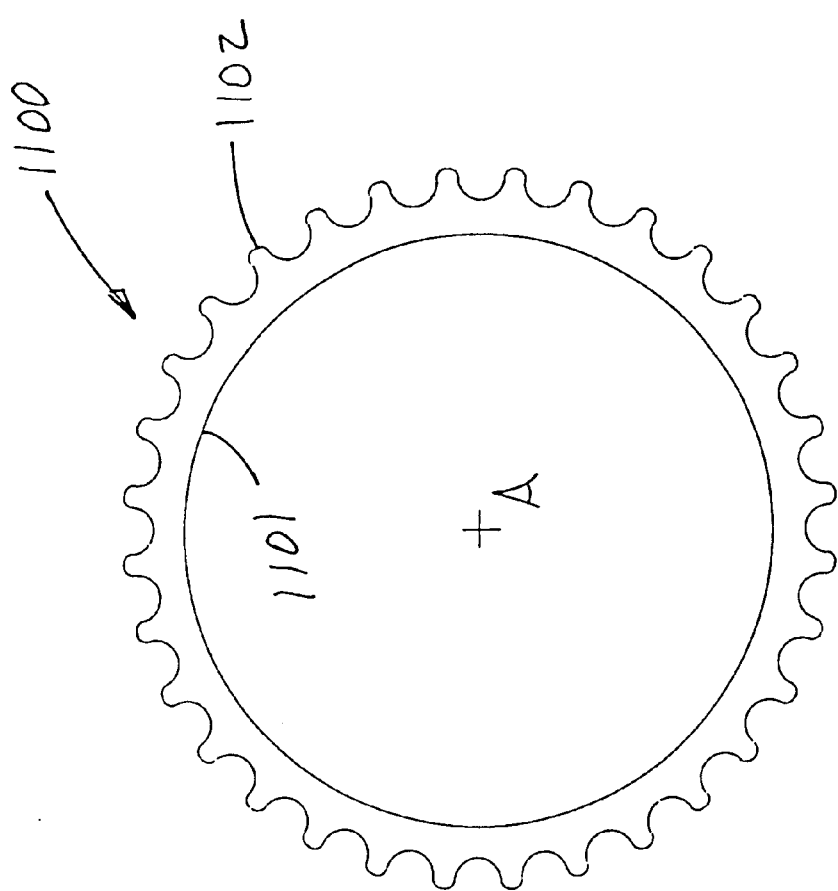
FIG. 11 is a side elevation view of a toothed ring.

FIG. 11 is a side elevation view of a toothed ring. Ring 1100 comprises teeth 1102. Toothed ring 1100 may comprise a flexible elastomer, plastic, phenolic or metallic material. Ring 1100 also comprises surface 1101. Surface 1101 allows the ring 1100 to fit over the bearing surface 16 of the idler in FIG. 1. In the preferred embodiment, the fit is an interference fit and can be bonded to the bearing surface 16 in order to provide a sufficient non-slip condition between the bearing surface 16 and the ring 1100. Ring 1100 allows a user to convert the flat surface idler in FIG. 1 to a toothed surface idler very easily.

Figure 12:
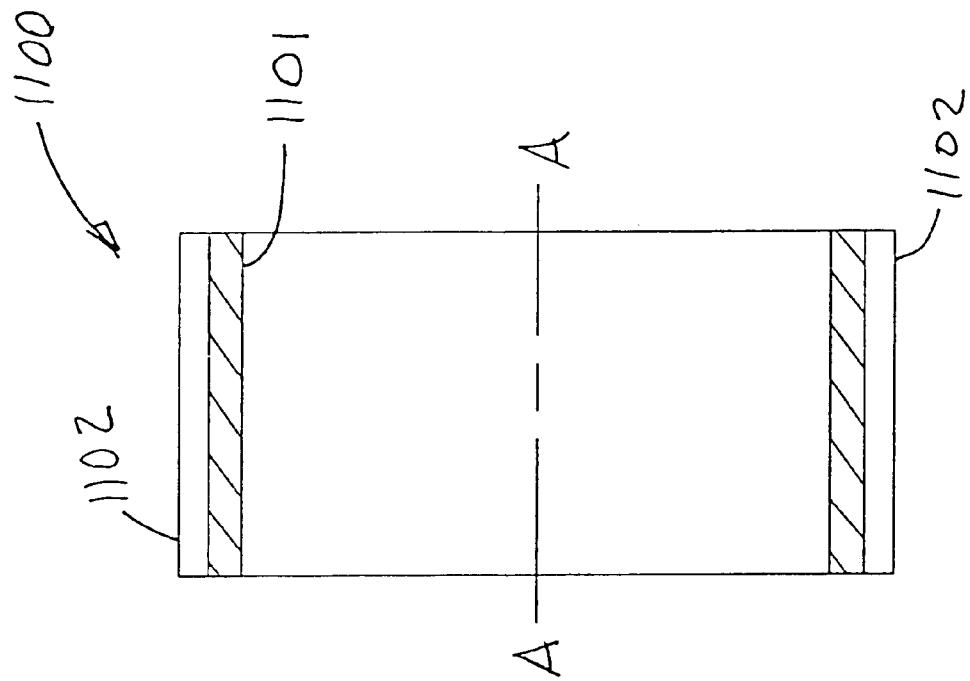
FIG. 12 is a front elevation view of a toothed ring.

FIG. 12 is a front elevation view of a toothed ring.

Although a single form of the invention has been described herein, it will be obvious to those skilled in the art that variations may be made in the construction and relation of parts without departing from the spirit and scope of the invention described herein.

I claim:

1. An idler comprising:

a hub;

a flexible member having a chamber containing a pressure and a continuous bearing surface on an outer circumference;

the pressure in the chamber is in excess of an ambient pressure; and the flexible member connected to the hub.

2. The idler as in claim 1, wherein the flexible member comprises an elastomeric material.

3. The idler as in claim 2, wherein the flexible member has a spring rate.

4. The idler as in claim 3, wherein the bearing surface is substantially flat.

5. The idler as in claim 3, wherein the bearing surface describes a profile.

6. The idler as in claim 3, wherein the flexible member is compressible in a direction normal to an idler rotational axis.

7. The idler as in claim 3, wherein the flexible member further comprises:

a first flexible ring having a mating surface normal to the continuous bearing surface;

a second flexible ring having a mating surface normal to the continuous bearing surface; and the first flexible ring mating surface bonded to the second flexible ring mating surface.

8. The idler as in claim 7, wherein the flexible member further comprises:

a first thickness T3 extending radially from an outer surface of the chamber to the outer circumference;

a second thickness T2 extending radially from a hub outer surface to an inner surface of the chamber; and T3 is greater than T2.

9. The idler as in claim 8, wherein the chamber further comprises:

a width w;

a height h; and w is greater than h.

10. The idler as in claim 9 further comprising:

a plurality of tensile members arranged parallel to a longitudinal axis of the flexible member.

11. The idler as in claim 10 further comprising:

a jacket bonded to the bearing surface.

12. The idler as in claim 9 further comprising:

a ring fitted to the outer circumference.

13. An idler system comprising:

a hub;

a flexible member having a chamber containing a pressure and a continuous bearing surface on an outer circumference;

the flexible member connected to the hub; and the flexible member engaging a belt whereby a belt vibration is damped.

14. The idler system as in claim 13, wherein the flexible member comprises an elastomeric material.

15. The idler system as in claim 13, wherein a pressure in the chamber is in excess of an ambient pressure.

16. The idler system as in claim 13 further comprising:

a plurality of tensile members arranged parallel to a longitudinal axis of the flexible member.

17. The idler system as in claim 13 further comprising:

a jacket bonded to the bearing surface.

* * * * *